Figure 1A:
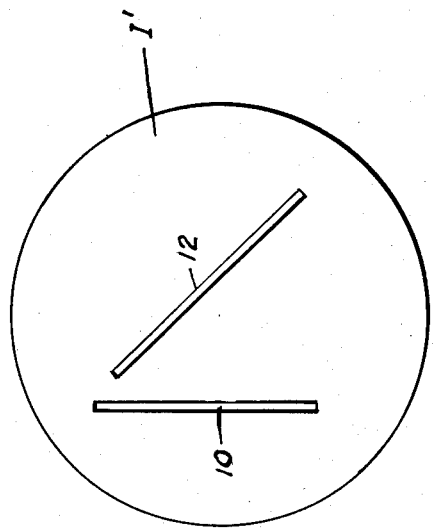

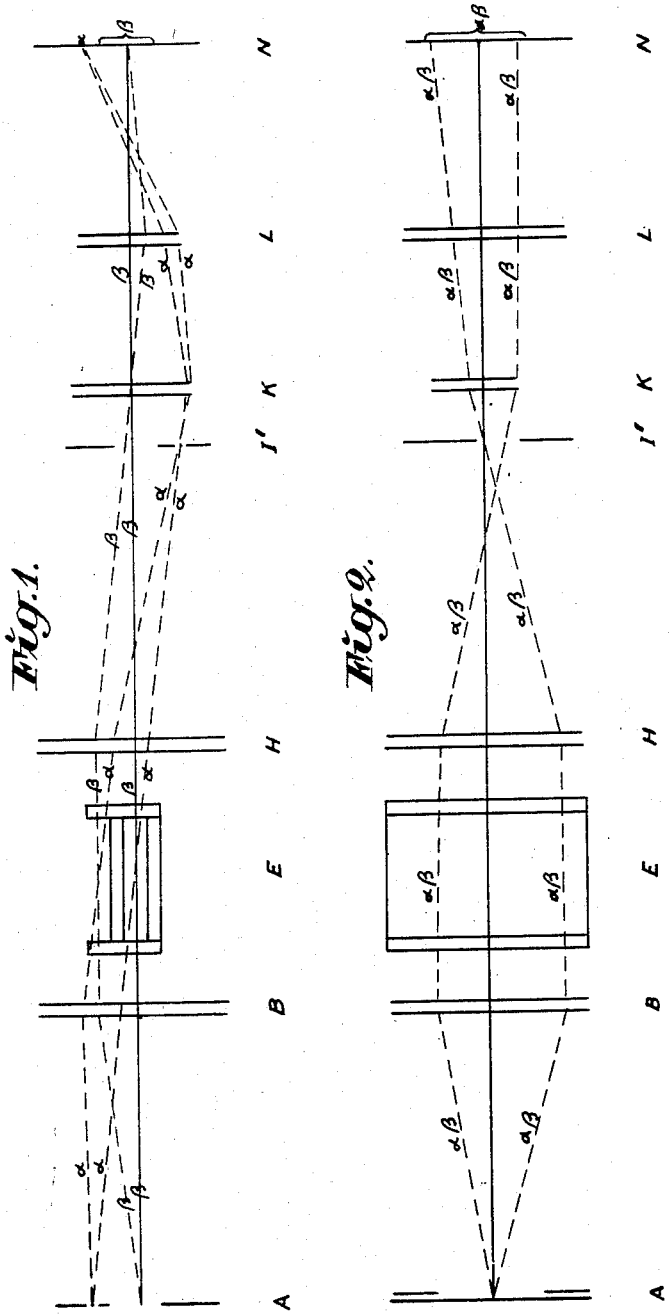

March 1, 1955 H. S. SVENSSON 2,703,033
OPTICAL ARRANGEMENT FOR ANALYSIS OF REFRACTIVE INDEX
Filed Feb. 20, 1951 3 Sheets-Sheet 3
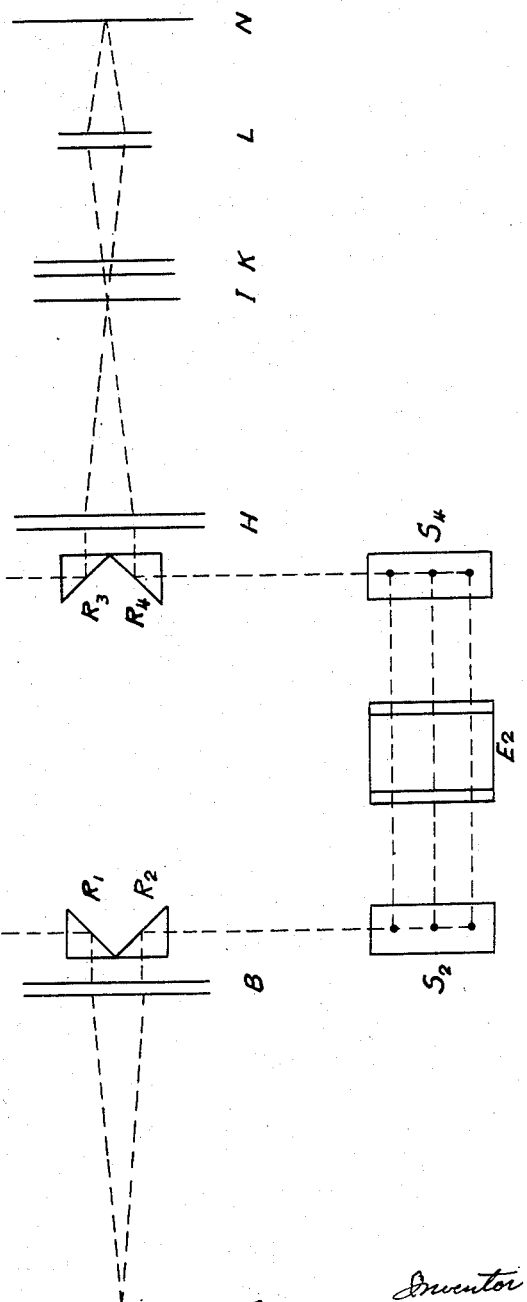

United States Patent Office

2,703,033
Patented Mar. 1, 1955

2,703,033

OPTICAL ARRANGEMENT FOR ANALYSIS OF REFRACTIVE INDEX

Harry S. Svensson, Sundbyberg, Sweden, assignor to LKB Produkter Fabriksaktiebolag, Stockholm, Sweden, a corporation of Sweden Application February 20, 1951, Serial No. 211,888

Claims priority, application Sweden February 22, 1950

4 Claims. (Cl. 88—14)

When it is a question of measuring the concentrations of dissolved substances from point to point in a cell, one has for a long time made use of optical methods. Those based on the measurement of refractive index form an important sub-group of these methods.

The problem of recording concentrations of stratified solutions occurs, e. g., in diffusion measurements, in electrophoresis and ultracentrifugal analysis, and in adsorption analysis. In all these cases the refractive index is a function of just one rectilinear space coordinate, viz. the coordinate of the axis in the direction of the gravitational or centrifugal field. This axis will in the following be called the cell axis, and the above can also be expressed in the way that the refractive index gradient has always one and the same direction, viz. that of the cell axis.

Stratified solutions have mostly been analyzed with the aid of optical methods which in the first phase give the derivative of the refractive index with respect to the position in the cell. The self-recording arrangements of Wiener, Thovert, Longsworth, and Philpot-Svensson belong here, as well as Lamm's scale method. In recent years, interferometric methods have been introduced, usually self-recording, which methods give the refractive index function itself. Which is most advantageous is a matter of opinion. The refractive index analysis aims at an accurate localization of the concentration increments of the dissolved substances and to an accurate measurement of the magnitudes of these increments. Only in diffusion measurements is it also of interest to know the manner in which the concentration varies from one value to another. A fully correct and accurate determination of the position of a concentration step cannot be carried out without knowledge of the concentration in every point of the boundary, but a good approximate value can in most cases be obtained by localization of that point where the concentration derivative has a maximum.

For an accurate and convenient measurement of the concentration increments at the boundaries, a record of the refractive index function itself is to be preferred since the measurement is then a simple distance measurement or a counting of the number of fringes, while in a derivative record one has to measure areas. Experience has shown, however, that the derivative is of the greatest value, if not almost necessary, even in these measurements on the refractive index function. The concentration, and hence the refractive index, does never rise suddenly from one value to another, but changes continuously within a certain interval, the breadth of which depends upon many factors, but above all on the diffusion of the dissolved substances. Within the interval mentioned, the refractive index forms a curve of the shape of an integral sign, the height of this curve being a measure of the total concentration step. In the presence of several components, each component will form such a curve. An accurate measurement of the height of each step can then only be carried out if each step is finished before the next one begins, i. e., the refractive index analysis becomes uncertain if there are no parts with constant refractive index between the steps. In practical work with these methods, one finds that this very seldom occurs. A record of the refractive index function itself then becomes difficult to interpret, while the corresponding derivative curve turns out to be much easier to deal with. In a derivative curve, a concentration step corresponds to a peak, and between the peaks minima are developed. In such a derivative record, one can, with a fairly small systematical error, resolve the different concentration steps from each other by drawing lines from the minima perpendicularly against the coordinate axis of the independent variable. There is no doubt that it is much easier to judge the number of steps and their relative magnitudes from a derivative pattern than from a record of the function itself.

The above refers to multi-component systems. In diffusion and equilibrium centrifuge measurements only one component is concerned, but even here the derivative methods appear to be very useful. Thus, the most common method of computing a diffusion coefficient requires knowledge of both the total concentration increase across the boundary and of the maximum derivative. Consequently, the situation is this: In the refractive index analysis of solutions, the main interest is bound to the refractive index function itself, but in some investigations numerical figures of both the refractive index and its derivative are required, and even in the cases remaining the derivative pattern is of the greatest value as an aid in the resolution of a complicated refractive index course into several separate steps and as an aid in the localization of the concentration steps.

As is well known, it is easy to derive one function from the other. If one has a derivative curve, one can get the function itself by integration. On the other hand, if a refractive index curve is available, the derivative curve can be obtained by differentiation. This is also the procedure which has hitherto been used in the evaluation, but which cannot be considered as quite satisfactory. An integration is a rather time-consuming process; a distance measurement on a pattern of the integral function can be made much more rapidly and more accurately. A differentiation is also time-consuming and, moreover, it is extremely difficult to perform it with a sufficient accuracy.

The present invention is a new optical arrangement for refractive index analysis of stratified solutions capable of giving simultaneous records of both the refractive index and its derivative, whereby the above-mentioned disadvantages have been removed. This new arrangement consists in a combination of an arrangement for recording the refractive index derivative according to Philpot, Svensson, or Longsworth with an interferometric arrangement for recording the refractive index according to the principles involved in the interferometers of Rayleigh, Jamin, Michelson, or others. It is a significant and characteristic feature of the invention that the two component optical systems chosen for the combination have many optical components in common. Moreover, the optical components serving only one record are arranged in such a manner that they do not obstruct or in other ways disturb the light paths belonging to the other record. In this way it is possible to construct as one unit an apparatus capable of giving records of the refractive index and its derivative side by side or superimposed over each other on the same photographic film or plate with the same cell magnification.

The invention is characterized by the following constructional details. (1) An illumination device for production of monochromatic radiation consisting of a lamp in connection with a light filter or monochromator and a condensing lens. (2) A slit arrangement having one single slit or two mutually perpendicular slits depending on what kind of interferometer is used in the combination. (3) A lens system for the production of an optical image of said slit or slits. (4) A cell for the solution to be measured with optically plane walls and placed in relation to the above-mentioned lens system so as to be completely and evenly illuminated. (5) A beam-splitting device of the type known from interferometers for the production of two coherent beams of light of equal dimensions and intensities, one of them being directed through the cell and the other beside the cell through a medium with a constant refractive index, the optical paths of the two beams being essentially of the same length. (6) A beam-collecting device of the type used in interferometers for reunion of the two coherent beams of light. (7) A partly light-obstructing device situated in the image plane of the light source slit or slits and carrying a rectilinear edge, slit or thread. (8) A lens system giving an optical image of the cell at least in a section parallel with the refractive index gradient. (9) A device for holding a photographic film or plate in the plane of this image. (10) A device known from the derivative-recording arrangements for transforming the light deflection in the image plane of the slit, which deflection goes in the direction of the cell axis, into a light deflection perpendicular thereto on the photographic film or plate.

Most of these items, such as the illumination device, the cell, the device for holding the photographic film or plate, and the whole lens system, serve both optical records, while some items are necessary only for one of the records. Thus the beam-splitting and beam-collecting devices are necessary only for the refractive index record, while the partly light-obstructing device and the device for transforming the light deflection in the direction of the gradient into a deflection perpendicular thereto is required only by the derivative record.

When in the above description an optical component is said to be parallel or perpendicular to the refractive index gradient or the cell axis, this refers to an optical system where the light is nowhere turned by reflexions in mirrors or prisms. In optical systems where such turning takes place, the definitions mentioned should be replaced by "parallel or perpendicular to the optical projection of the refractive index gradient or the cell axis." The optical projection of the cell axis in a certain plane of the optical system is then defined as an axis parallel with the optical image of the cell axis in that plane or with the virtual image of the cell axis seen by an observer situated in that plane. When the light is not turned, the direction of the refractive index gradient of the cell axis is the same in the direction of the optical projection and therefore the latter expression has been used as a definition in the claims.

The invention covers all combinations of the known derivative recording arrangements according to Longsworth (J. A. Chem. Soc. 61, 529, 1939), Philpot (Nature 141, 283, 1938) and Svensson (Kolloid-Z. 87, 181, 1939; 90, 141, 1940; Ark. Kem. Mineral. Geol. 22 A, No. 10, 1946), with known interferometric arrangements according to Rayleigh, Jamin, or Michelson. Concerning the application of these interferometric methods to stratified solutions reference is made to Calvet and Chevalerias (J. chim. phys. 43, 37, 1946). Philpot and Cook (Research 1, 234, 1948), Labhart and Staub (Helv. Chim. Acta 30, 1954, 1947), Antweiler (Kolloid-Z. 115, 130, 1949), and Svensson (Acta Chem. Scan. 3, 1170, (1949).

The derivative-recording arrangement of Longsworth, often referred to as the Schlieren scanning arrangement, is characterized by the items (1), (2), (3), (4), (7), (8), (9), and (10), listed above. The item (2) contains a single slit perpendicular to the optical projection of the refractive index gradient. The item (7) is rectilinear edge, slit, or thread parallel with the optical image of item (2). The item (8) is a spherical lens system giving an optical image of the cell in both sections. The item (10) is purely mechanical and consists of a narrow slit parallel with the optical projection of the refractive index gradient and placed closely in front of the photographic film or plate, and a motor-driven device causing the item (7) and the item (9) to move simultaneously at constant speeds in direcions parallel with and perpendicular to, respectively, the optical projection of the cell axis.

The derivative-recording arrangement according to Philpot-Svensson differs from the Schlieren scanning arrangement in the following respects. The item (7) is a rectilinear edge, slit or thread neither parallel with, nor perpendicular to the optical image of item (2). The item (8) is an astigmatic lens system with its axes parallel with and perpendicular to the optical projection of the cell axis, giving in a section parallel with said projection an optical image of the cell and in a section perpendicular thereto an optical image of item (7) on the photographic film or plate. The item (10) is in this case identical with the items (7) and (8) in that the inclination of item (7), together with the property of item (8) of giving an optical image of item (7), serves the purpose of item (10).

The interferometric arrangements described for the study of stratified solutions can be subdivided into two main groups, viz. those based on aperture-splitting interferometers (Calvet-Chevalerias, Philpot-Cook, Svensson) and those based on amplitude-splitting interferometers (Labhart and Staub, Antweiler). The aperture-splitting interferometers are characterized by a beam-splitting device consisting of two equal slits in a diaphragm, and by a beam-collecting device which is identical with the lens system forming an optical image of the light source slit. They are further characterized by a lens system giving in a section parallel with the optical projection of the refractive gradient an optical image of the cell, and in a section perpendicular thereto an optical image of the light source slit. Consequently these interferometric arrangements cannot be combined with the Schlieren scanning arrangement, which produces an image of the cell in both dimensions.

The amplitude-splitting interferometric arrangements are characterized by a beam-splitting device consisting of a half-silvered optically plane glass plate at which half of the radiation energy is reflected and the other half is transmitted by the metal foil. The beam-collecting device is of the same construction and may be identical with the beam-splitting device. These interferometers are further characterized by having a lens system giving an optical image of the cell in the section parallel with the optical projection of the gradient. In the perpendicular section, there may arbitrarily be optical imagery of the cell or of the light source slit, although the latter possibility has not hitherto been recognized in the literature but forms part of this invention. Consequently it is possible to combine these interferometric arrangements with any of the two derivative-recording arrangements concerned in this invention.

On the enclosed drawings are shown some examples of how the desired results can be achieved; it is not the purpose to restrict the invention to these examples.

Figure 3:
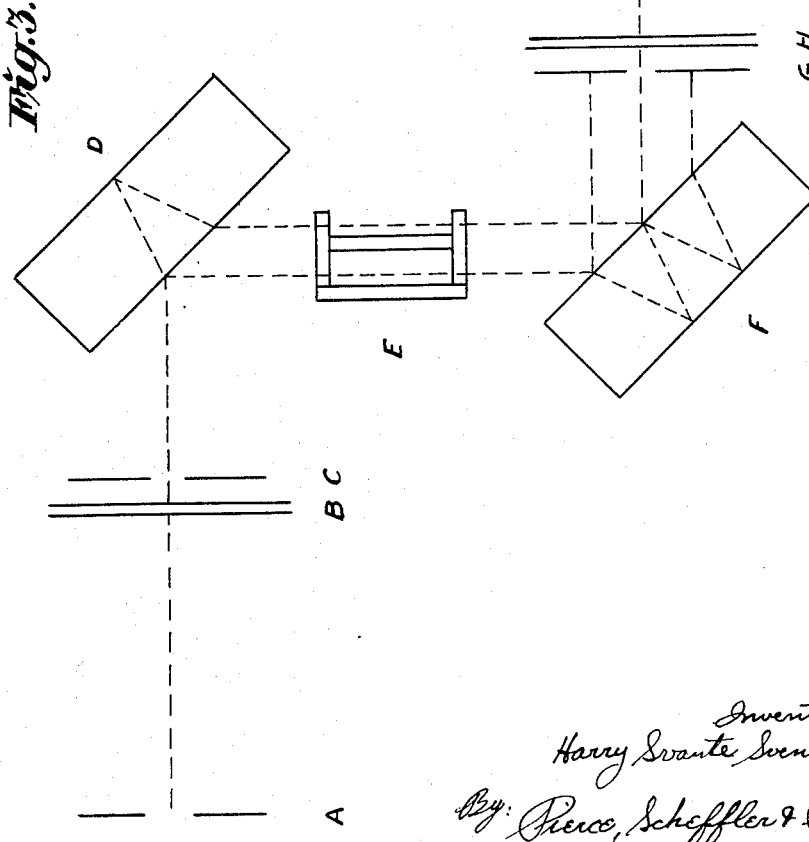

Figs. 1–2 show a combination of a Philpot-Svensson arrangement and Rayleigh's interference refractometer so modified that an optical image of the cell is formed, Fig. 1 being the arrangement in plan, and Fig. 2 in elevation. Fig. 1a shows a preferred embodiment of the partially light-obstructing device situated in the image plane of the light source slit. Fig. 3 shows a combination of a Schlieren scanning arrangement with Jamin's interferometer, in plan. Fig. 4 shows a combination of a Philpot-Svensson arrangement and an interferometer so designed that it becomes useful for simultaneous recording of refractive index and its derivative in centrifuge cells, the optical components being so chosen and so placed as to satisfy the special requirements of the centrifuge rotor on the light paths. Fig. 5 is a special prism with two totally reflecting faces which is used in the arrangement according to Fig. 4.

The same or corresponding components have been given the same notation on the drawings. Thus, A denotes a mechanical construction with one or two illuminated slits depending upon which combination is concerned. B is an objective at the focal distance from the light source slit or slits, A. C is a stop which is used only in the Jamin interferometer. D and F are diagonally placed plane glass plates, and G is another stop. E is the cell containing the refractive index function. H is an objective which refocuses the parallel light from the objective B. I' denotes the diagonal slit in the crossed-slit arrangement and I the movable edge in the Schlieren scanning method, which two components correspond to each other with regard to their functions. K is an objective which throws an image of the cell on the plate or film, while L is a cylindrical objective with a vertical axis which, in the case where the crossed-slit method is used, throws an image of the inclined slit I on the plate or film N. More generally spoken, K—L denotes an astigmatic lens system which in a section parallel with the optical projection of the refractive index gradient in the cell gives an optical image of the cell, and in a section perpendicular thereto an optical image of the inclined slit I, both images being thrown on the photographic film or plate N. M is a narrow slit parallel with the optical image of the cell axis and placed immediately in front of the photographic plate or film N. In Fig. 4, $R_1$, $R_2$, $R_3$, and $R_4$ are four totally reflecting prisms, and $S_1$, $S_2$, $S_3$, and $S_4$ are four specially constructed prisms as shown in Fig. 5 in three dimensions, with the function of directing the light beams into the cell and back from the cells to the optical axis, respectively, and simultaneously turning them through 90°.

Light pencils serving only the refractive index record have been denoted by α, while those serving only the derivative record carry the notation β.

Below there follows a detailed description of some arrangements typical for the invention.

(1) *Combination of the Philpot-Svensson arrangement with the Rayleigh interferometer.*—The Figures 1 and 2 show how this combination can be carried out. In the focal plane of the objective B there is a mechanical construction A containing one horizontal and one vertical slit side by side and illuminated by monochromatic light. The objective H gives an image of the slits in the plane I', where a mechanical construction is placed which gives free passage to light coming from the vertical slit, whereas the light from the horizontal slit falls upon an inclined slit. Thus, an embodiment as shown in Fig. 1a, the optical image of the vertical light source slit falls completely within the slit 10, of the light obstructing device I' and this light will thus pass unobstructed through said slit, whereas the optical image of the horizontal light source will cross the diagonal slit 12, and this light will thus be obstructed except for the small zone where the image and the diagonal slit intersect. The cell E with the refractive index function is situated between the objectives B and H. It should be imagined as submerged into a thermostat with a liquid of substantially the same refractive index as that in the cell. The walls of the cell which are perpendicular to the optic axis continue a distance beyond one of the side walls in order to give light passing beside the cell substantially the same optical path length as light passing through the cell. The objective K throws an image of the cell on the plate or film N, while the cylindrical objective L with a vertical axis gives an image of the plane I (of the diagonal slit) on the plate. Since the lens system K—L is astigmatic and has two different focal distances depending upon whether it is looked upon in plan or in elevation, it has the property of giving, on the same plate N, optical images of two planes situated far apart, viz. the planes I' and the middle of E. These two images are, however, both one-dimensional, i. e. the vertical coordinate scale of the cell and the horizontal coordinate scale of the inclined slit, both with certain magnification factors, are transformed to the plate N.

If the vertical light source slit is removed in Figs. 1–2, there remains a crossed-slit arrangement according to Philpot-Svensson. On the other hand, if the horizontal light source slit, the diagonal slit, the objective K and the cylindrical lens L, are removed, and if the plate N is shifted to the plane I, there remains an interferometer according to Rayleigh. This, however, is only able to measure constant refractive indices in white light. The modification of the interferometer used in this combination and characterized by the introduction of monochromatic light and the astigmatic lens system K—L and by shifting the plane of observation to the image plane of this lens system, renders the interferometer capable of recording a variable refractive index without otherwise changing its principles. Hereby the lens system K—L becomes a necessary component in the interferometer as well as in the crossed-slit arrangement.

Since the two light source slits in the plane A lie side by side, their images in the plane I will also lie side by side. Since in plan the planes I and N are also corresponding image planes, the refractive index pattern and derivative pattern will also lie side by side on the plate and have the same cell magnification factor.

(2) *Combination of the Schlieren scanning or the Philpot-Svensson arrangement on the one hand and an interferometric arrangement according to Jamin or Michelson, or a related interferometric arrangement, on the other.*—Fig. 3 shows the combination of the Schlieren scanning arrangement with Jamin's interferometer, the latter having been modified in order to produce an optical image of the cell. A is a horizontal slit illuminated by monochromatic light and situated in the focal plane of the objective B. C is a diaphragm, while D and F are the two inclined, half-silvered plane glass plates characteristic of the Jamin interferometer. The cell E is situated between these plates. G is another diaphragm, and the objective H gives an image of the light source slit in the plane I. In this plane the vertically movable edge characteristic of the Schlieren scanning arrangement is situated. The objective K produces an image of the cell on the plate or film N, which is close behind a narrow slit M perpendicular to the light source slit. The plate can be moved at a constant rate horizontally, i. e. perpendicularly against the slit M, and this movement is mechanically coupled to the vertical movement of the edge I.

In this arrangement, the following components form together a Schlieren scanning arrangement according to Longsworth: the slit A, the objective B, the cell E, the objective H, the movable edge I'', the objective K, the slit M, and the plate N. On the other hand, the following components form together a cell-focusing interferometer according to Jamin: the slit A, the objective B, the diaphragm C, the plane glass plates D and F, the cell E, the diaphragm G, the objective H, the objective K, and the plate N. The Schlieren scanning arrangement, in its original form, will still function in the presence of the diaphragms C and G and the plane glass plates D and F. On the other hand, the interferometric method will still function in the presence of the movable edge I and the slit M, if only the former is in such a position that it does not obstruct any light coming from the cell. The horizontal movement of the plate does not make the photography of the interference pattern impossible.

The photography of the refractive index and the derivative patterns on the same plate can now be done in two principally different ways. One can make the two photographs after each other in time by first cutting off the light outside the cell and making a Schlieren scanning, and then, when the edge I no longer cuts off any light, by letting through the pencil beside the cell for getting the interference fringes. The two photographs can be taken in immediate succession. Even the movement of the plate and edge may continue during the exposure of the interferogram, and the slit M can be left in position. On the other hand, the two patterns can be exposed strictly simultaneously, which implies that both the component methods are modified, are adapted to each other and are intimately united into a new combination method. If, namely, the Schlieren scanning is carried out without screening off the light pencil passing outside the cell, the interference fringes will be visible outside the Schlieren shadow in the form of horizontal bright and dark fringes. Where the Schlieren shadow begins, the interference fringes will end, since one of the interfering light pencils is cut off by the movable edge. This modification of the Schlieren scanning method differs from the original in that even the region within the shadow will become blackened on the plate, since the light passing beside the cell is not deflected and is thus not cut off by the movable edge. In the absence of interference, one would thus get two fields with different degrees of blackening, the boundary line between these fields giving the course of the refractive index derivative. Now the interference fringes in the field outside the Schlieren shadow are added, and hence the contour of the derivative curve is above all defined by the end points of the interference fringes. Simultaneously, the mutual positions of the interference fringes give direct information of the course of the refractive index function (by counting the number of fringes and plotting this number as a function of their positions).

The manner by which the same principles should be applied using the related types of interferometers is quite evident for a person with some optical experience and need not be described here. On the contrary, the necessary arrangements for achieving the corresponding result with the Philpot-Svensson method instead of the Schlieren scanning method will be described below.

If one desires the derivative curve and the interferogram side by side, one has to use one vertical and one diagonal slit side by side in the plane of the inclined slit, both slits being illuminated by the image of the light source slit. The vertical slit should suitably not be too narrow and should be long enough to allow all deflected light to pass through. The two slits will then form images side by side on the plate. The interference fringes appear in the image of the vertical slit in the form of horizontal bright and dark bands. The derivative curve is found in the image of the diagonal slit as usual, yet with the difference that interference takes place in those parts of the curve which do not separate from the base line.

If one desires the derivative curve and the interferogram intimately united in one picture, one can use one diagonal and one horizontal slit interconnected in their point of section in the plane I of the inclined slit. The resulting angle slit is then so oriented that its horizontal part lets through that light which is not deflected in the cell. By this modification, the whole field of view on the plate will be illuminated, not only the base line and the derivative curve as in the original crossed-slit method. Nevertheless, the derivative curve will appear, since within it, and only within it, interference will take place. Namely, in the very derivative curve, and only there, will the two coherent pencils be broken together and thus be able to interfere with each other.

Still another variant is possible, viz. if one abandons the inclined slit in favour of an inclined edge. This variant corresponds most closely to the Schlieren scanning method and will also give exactly the same result as that described above for this method. Consequently, one will then obtain one homogeneously blackened field and one field filled with interference fringes, the boundary line between these two fields being the derivative curve.

In Figs. 1–2, the pencils denoted by $\alpha$ serve the refractive index record, while those serving the derivative record have the notation $\beta$. In the latest described arrangements, where the two records appear intimately united in the same picture, it is natural that such a distinction between different pencils cannot be made. In these arrangements for carrying out the invention, all light pencils will more or less serve the recording of both functions.

(3) *Combination of the Philpot-Svensson or the Schlieren scanning arrangement with an Interferometer, the combination being adapted to an analytical centrifuge.*—Although this combination can be carried out according to the principles described under (1) and (2), special problems appear in addition here. Interference should suitably take place between two identical cells at two diametrically opposed points of the rotor, one of them being filled with the solution to be investigated, and one with the solvent. Further, it must be arranged that interference takes place between corresponding points in the two cells, so that a pencil passing through the periphery part of one cell is brought to interference with a pencil passing through the periphery part of the other cell. The arrangement can be built according to Fig. 4. In the plane A, which is the focal plane of the lens B, the light source slit or slits, respectively, are situated. After passage of the objective B, the light is split up into two beams by the two totally reflecting prisms $R_1$ and $R_2$, which direct the light out of the periphery of the rotor (the axis of the rotor coincides with the optic axis of the lens system). The components $S_1$ and $S_2$ are two special prisms with two totally reflecting faces which have the function of directing the light into the cells and simultaneously turning the oblong light beams through 90° so that their orientation and extension coincide with those of the cells in the observation positions. The construction of the special prisms is evident from Fig. 5. After the cells have been passed, the light strikes two similar special prisms $S_3$ and $S_4$ which turn the light beams back again through 90° and direct them back again to the neighbourhood of the optic axis. Here the light is caught by the two totally reflecting 45° prisms $R_3$ and $R_4$ which direct it into the lens system HKL to the plate or film N. This lens system, as well as other optical components outside the objectives B and H, is designed and adjusted as described earlier.

I claim:

1. An optical apparatus for the analysis of variations in refractive index of a solution in a cell where the refractive index gradient has everywhere the same direction, said apparatus giving combined records of the refractive index and its derivative with respect to the position along the direction of said refractive index gradient, comprising an illumination device for the production of monochromatic radiation, a slit arrangement having at least one narrow slit illuminated by said device, a lens system giving an optical image of said slit, a cell for the solution to be measured placed in relation to said lens system so as to be completely and evenly illuminated, a beam-splitting device for the production of two coherent beams of light of equal dimensions and intensities, one of them being directed through the cell and the other beside the cell through a medium of constant refractive index, the optical paths of the two beams of light being essentially of the same length, a beam-collecting device for reunion of the two beams of light, a partly light-obstructing device situated in the first image plane of the light source slit and having at least one rectilinear edge, a lens system giving an optical image of the cell at least in the section parallel with the optical projection of the refractive index gradient, a device for holding a photographic film or plate in the plane of said optical image, and a device for transforming the light deflection at said light-obstructing device, said deflection going in the direction of said gradient projection, into a light deflection perpendicular thereto in the image plane of the cell.

2. An optical apparatus as claimed in claim 1, characterized in that the light source slit arrangement has two slits, one parallel and the other, situated at one side of the first, perpendicular to the optical projection of the refractive index gradient in the cell, that the beam-splitting device consists of two equal apertures, one of which allows the light to pass through the cell, that the beam-collecting device is identical with the lens system which causes optical imagery of said slits, that the partly light-obstructing device has at least one rectilinear edge inclined towards the optical projection of the refractive index gradient and that it does not obstruct the light coming from the slit parallel with said projection, and that the device for transforming the light deflection in the plane of the light-obstructing device into a light deflection perpendicular thereto in the image plane of the cell consists of an astigmatic lens system which gives optical imagery between said two planes in a section perpendicular to the optical projection of the refractive index gradient; said optical apparatus thus being a combination of the Rayleigh-Calvet-Philpot arrangement for recording the refractive index with the Philpot-Svensson arrangement for recording its derivative with common lens system and apertures, said combination giving on one and the same image plane two pictures side by side, with the same cell magnification, one being an interferogram with a complete record of the refractive index, and the other being a record of the refractive index derivative in the cell.

3. An optical arrangement as claimed in claim 1 characterized in that the light source arrangement has an aperture of very small extension in the direction parallel with the optical projection of the refractive index gradient in the cell, that the beam-splitting device consists of a partly reflecting and partly transmitting optically plane surface, that the beam-collecting device is of the same construction, that the partly light-obstructing device has a least one rectilinear edge perpendicular to said optical projection of said gradient, that the lens system is spherical throughout, and that the device for transforming the light deflection at the light-obstructing device into a deflection perpendicular thereto in the plane of the film or plate consists of a narrow slit parallel with the optical projection of the refractive index gradient and placed close to the film or plate, and of a motor-driven arrangement for slow simultaneous movement of the said light-obstructing device in the direction parallel with and of the plate or film in the direction perpendicular to said projection of the refractive index gradient; said optical apparatus thus being a combination of an interferometric arrangement with amplitude-splitting of the light for recording the refractive index with a Schlieren-scanning arrangement for recording its derivative, said combination being capable of giving pictures where the two records lie side by side as well as pictures where the derivative contour is defined as the locus for the disappearance of the interference fringes within the interferogram.

4. An optical apparatus as claimed in claim 1, characterized in that the light source slit arrangement carries an aperture of very small extension in the direction parallel with the optical projection of the refractive index gradient in the cell, that the beam-splitting device consists of a partly reflecting and partly transmitting optically plane surface, that the beam-collecting device is of the same construction, that the partly light-obstructing device has at least one rectilinear edge at an acute angle with said gradient projection, that this device partially obstructs light having suffered deflection in the cell but lets through the undeflected light, and that the device for transforming the light deflection in the plane of the light-obstructing device into a deflection perpendicular thereto in the plane of the plate or film consists of an astigmatic lens system which gives optical imagery between said two planes in a section perpendicular to the optical projection of the refractive index gradient; said optical apparatus being such a combination of an interferometric arrangement with amplitude-splitting of the light for recording the refrective index with an astigmatic Schlieren arrangement for recording its derivative, which gives interferograms in which the locus of the disappearance of the interference fringes defines the derivative contour.

References Cited in the file of this patent

UNITED STATES PATENTS 2,256,855   Zobel _____ Sept. 23, 1941

FOREIGN PATENTS 355,911   Great Britain _____Sept. 3, 1931
386,315   Great Britain _____ Jan 12, 1933
919,843   France _____ Dec. 16, 1946

OTHER REFERENCES

Svensson, H., "An Interferometric Method for Recording the Refractive Index Derivative in Concentration Gradients," published in Acta Chemica Scandinavica, vol. 3 (1949), pages 1170 through 1177.